United States Patent [19]

Ryan

[11] Patent Number: 4,560,525
[45] Date of Patent: Dec. 24, 1985

[54] METHOD OF MAKING A MOLDED FIBER REINFORCED PLASTIC LEAF SPRING

[75] Inventor: William E. Ryan, Milwaukee, Wis.

[73] Assignee: A. O. Smith Corporation, Milwaukee, Wis.

[21] Appl. No.: 543,354

[22] Filed: Oct. 19, 1983

[51] Int. Cl.⁴ .............................................. B29C 43/18
[52] U.S. Cl. .................................... 264/136; 264/161; 264/320; 267/148
[58] Field of Search ............... 264/134, 136, 161, 320; 267/148

[56] References Cited

U.S. PATENT DOCUMENTS

| 2,787,024 | 4/1957 | Smith | 264/161 |
| 3,140,325 | 7/1964 | Graff | 264/136 |
| 4,014,970 | 3/1977 | Jahnle | 264/161 |

*Primary Examiner*—Donald Czaja
*Assistant Examiner*—V. Fischbach
*Attorney, Agent, or Firm*—Andrus, Sceales, Starke & Sawall

[57] ABSTRACT

A molded fiber reinforced plastic leaf spring. The spring has a curved central section composed of longitudinally extending fibrous strands impregnated with a cured thermosetting resin. The central section is generally rectangular in cross section having rounded upper and lower edges and a ground-off parting line disposed substantially at the neutral axis of the spring.

2 Claims, 5 Drawing Figures

METHOD OF MAKING A MOLDED FIBER REINFORCED PLASTIC LEAF SPRING

BACKGROUND OF THE INVENTION

There has recently been considerable activity in the production of fiber reinforced plastic leaf springs for vehicles due to the substantial reduction in weight as compared to metal leaf springs. Fiber reinforced plastic leaf springs can be produced by winding fibrous strands impregnated with a thermosetting resin around a pair of spaced bushings. After the desired number of windings have been made to produce the required strength characteristics, the wound structure is placed in a mold and the thermosetting resin is cured. The resulting cured product consists of a generally curved central section and integrally connected end portions having openings or eyes adapted to receive connecting members.

In other methods of manufacture, the curved central section of the leaf spring is molded separately from resin-impregnated fibrous material, and after molding, the ends of the central section are mechanically connected to metal end members having openings to receive connectors that connect the spring to a vehicle.

It is desired that the curved central section of the spring have rounded, longitudinal edges because sharp edges tend to produce high stress areas. Rounded bottom edges can readily be produced in the molded structure by utilizing rounded corners for the female mold. However, in the past rounded upper edges have not been satisfactorily produced by molding. Grinding away the molded sharp upper edges acts to remove and sever the reinforcing fibers which reduces the strength characteristics of the spring.

In any molding operation flash is produced at the parting line between the male and female molds. When molding a fiber reinforced plastic leaf spring, some fibers are carried into the flash and after molding, on removal of the flash, these fibers are ground away. If the flash is located at the upper portion of the spring, which is a high stress area, the removal of the flash and severing of the fibers at this location can adversely effect the physical properties of the spring. Furthermore the severed fibers tend to produce sharp needle-like projections which can be a hazard to handling of the spring.

SUMMARY OF THE INVENTION

The invention is directed to a molded fiber reinforced plastic leaf spring. The spring is composed of a curved central section, and end sections are integrally connected to the ends of the central section and have openings to receive connectors for attachment to the vehicle.

The curved central section is generally rectangular in cross section having opposed upper and lower surfaces connected by side surfaces, and the longitudinal edges joining the side surfaces to the upper and lower surfaces are rounded or curved.

The ground off flash at the parting line is located substantially at the neutral axis of the central action in a low stress area, so that any severing of fibrous material on removal of the flash will not adversely effect the physical characteristics of the spring.

In accordance with the method of the invention, the curved central section of the spring is molded in a mold assembly consisting of a female mold and a cooperating male mold. The female mold includes a bottom wall and side walls which are connected to the bottom wall by rounded corners, while the male mold is composed of an upper wall and side walls which extend downwardly and are received within the side walls of the female mold. The side walls of the male mold are connected to the upper wall by rounded corners and the lower extremities of the side walls of the male mold terminate in generally flat surfaces.

In the molding operation, the wound fibrous structure impregnated with the uncured thermosetting resin is placed in the female mold and the molds are then moved relative to each other to bring the male mold into registry with the female mold. Sufficient compressive force is applied to the male mold to bring the lower extremities of the side walls of the male mold to a point on the neutral axis of the spring. During the molding, the liquid resin and fibrous reinforcement may be squeezed out along the parting line between the side walls of the male mold and the adjacent side walls of the female mold to produce flash. As the flash is located on the neutral axis of the spring, the subsequent removal of the flash, after the molding operation, and severing of the fibrous material will not adversely effect the physical properties of the spring.

The resulting molded leaf spring has rounded upper and lower longitudinal edges, obtained without machining or grinding, which reduces the stress concentrations at the edges. Because of this, the spring has better physicl properties per unit weight than prior art fiber reinforced plastic leaf springs.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
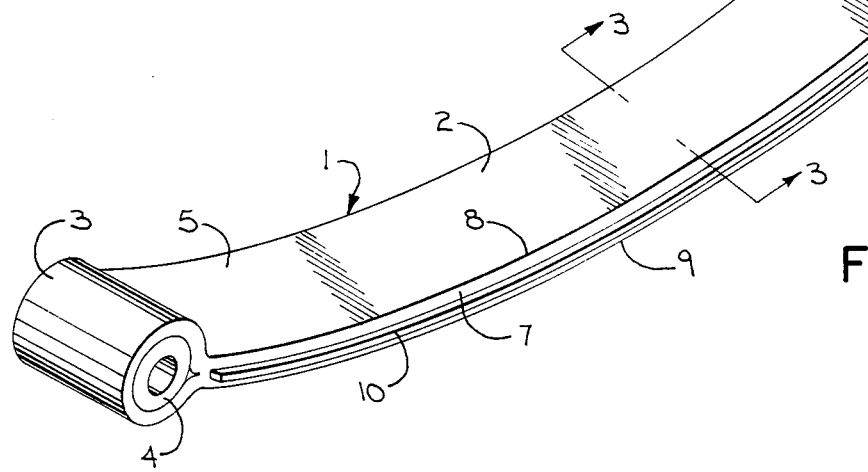
FIG. 1 is a perspective view of a fiber reinforced plastic leaf spring as produced by the invention.

FIG. 1 illustrates a fiber reinforced plastic leaf spring 1 to be used for a vehicle and composed of a curved central leaf section 2 and end sections 3. Each end section 3 is provided with a metal or plastic bushing 4 having an opening to receive a connecting member to attach the spring to a vehicle in the conventional manner.

The central section 2 and end sections 3 are preferably composed of substantially continuous windings of fibrous material impregnated with a cured thermosetting resin. The fibrous reinforcement can take the form of mineral fibers, such as glass; vegetable fibers, such as cotton; animal fibers such as wool; synthetic fibers such as nylon, Dacron, or Orlon; or metal fibers, such as steel wire.

The thermosetting resin can be any conventional thermosetting resin, such as an epoxy or polyester resin, used in forming fiber reinforced resin products.

Figure 3:
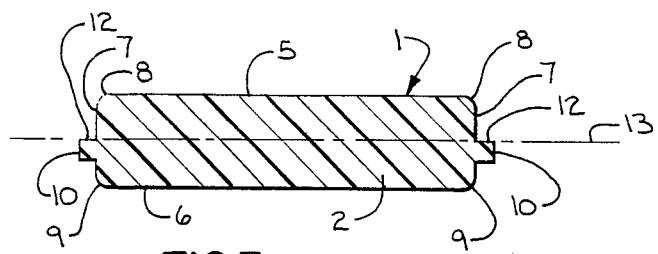
FIG. 3 is a section taken along line 3—3 of FIG. 1.

As shown in FIG. 3, the central section 2 is generally rectangular in cross section, having an upper surface 5 and a lower surface 6 connected by side surfaces 7. The longitudinal edges 8 connecting the upper surface 5 and side surfaces 7, as well as the longitudinal edges 9 connecting lower surface 6 and side surfaces 7, are generally curved or rounded which tends to reduce stress concentrations at these areas.

In addition, longitudinal ribs 10 extend outwardly from each side surface 7 and ribs 10 have flat upper surfaces 12 that lie generally along the neutral axis 13 of the spring. In the lower stress areas of central section 2, adjacent end sections 3, ribs 10 are less prominent and merge into the end sections.

Figure 2:
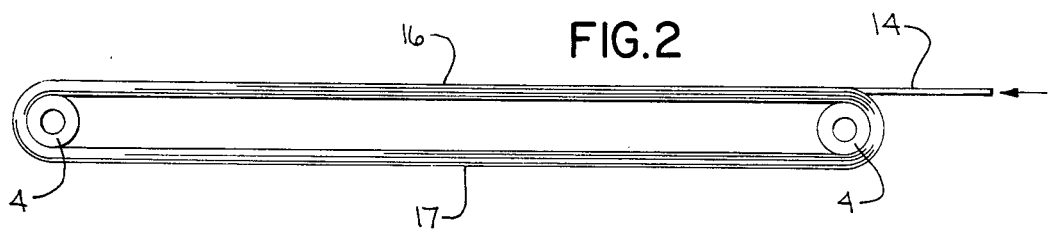
FIG. 2 is a schematic view showing a method of winding the leaf spring prior to molding.

FIG. 2 illustrates schematically a manner of winding leaf spring 1 from continuous strands or rovings 14 of fibers impregnated with the uncured resin. In this method, the strands 14 are wound helically around the spaced bushings 4. When the desired number of layers are wound to obtain the required physical properties in the spring, the wound structure, with the tension relaxed, is placed in a mold assembly 15, with the two runs 16 and 17 of the wound structure falling together in the bottom of the cavity 18, in the female mold 19.

Figure 4:
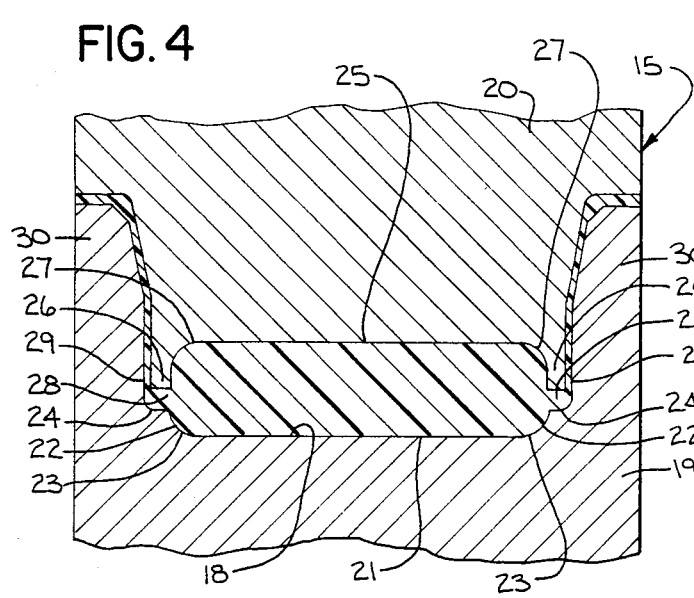
FIG. 4 is a transverse section of the mold assembly for molding the curved central section of the leaf spring.

The mold assembly 15 also includes a male mold 20 which is adapted to cooperate with the female mold 19 to mold the wound structure. As best illustrated in FIG. 4, cavity 18 of female mold 19 is defined by a bottom wall 21 and a pair of spaced side walls 22 which are joined to the bottom wall by rounded corners 23. Each side wall 22 is provided with a generally flat upwardly facing shoulder 24.

Male mold 20 consists of an upper wall 25 and a pair of spaced downwardly extending side walls 26 which are received within the side walls 22 of the upper portion 30 of female mold 19. As illustrated in FIG. 4, the side walls 26 are connected to upper wall 25 by rounded corners 27. The lower extremities of side walls 26 terminate in flat surfaces 28 aligned with shoulders 24.

Figure 5:
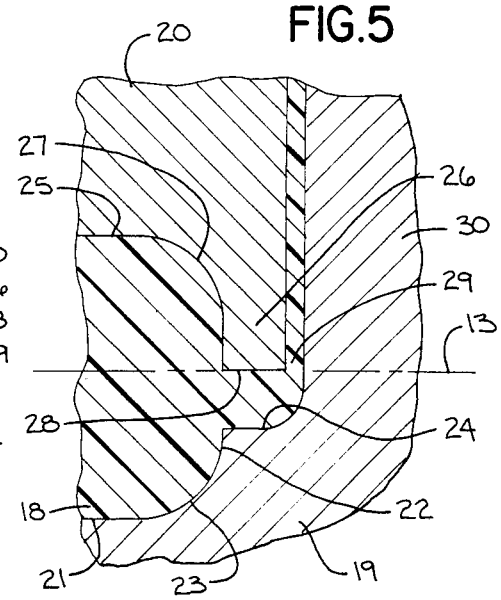
FIG. 5 is a fragmentary enlargement of the structure shown in FIG. 4.

After the wound structure of the central section 2 is placed in the cavity 18 of the female mold 19 a predetermined force is applied to male mold 20 to compress the wound material. The predetermined force applied to the male mold will bring the lower surfaces 28 of side walls 26 of male mold 20 into general alignment with the neutral axis 13 of the spring section 2. The neutral axis 13 lies midway of the height of central section 2, as illustrated in FIGS. 3 and 5.

During the molding operation, a portion of the uncured resin, along with some fiber reinforcement may be squeezed or extruded outwardly along the parting line 29 between the male and female molds. The parting line is located at the junction between the outer surface of the side walls 26 of male mold 20 and the inner surface of upper portion 30 of female mold 19.

Heat is normally applied to the fiber reinforced plastic structure during the molding operation to accelerate the cure of the thermosetting resin. Heat can be applied by placing the mold in an oven, or alternately employing a heating mechanism formed integrally with the male and female molds.

After curing of the resin, male mold 20 is removed from the cavity 18 of the female mold and the molded structure is removed from the female mold. The material extruded along the parting line 29 during the molding operation will constitute flash which can be ground away to complete the operation. As the flash is located along the neutral axis 13, the grinding of the flash, and the severing of fiber reinforcement located in the flash, will not adversely effect the physical properties of the molded spring.

As both the male and female molds have rounded corners as indicated by 23 and 27, the molded central section 2 will have rounded upper and lower longitudinal edges 8 and 9 and this reduces high stress concentrations at these edges.

Ribs 10 are formed by cooperation of shoulders 24 and surfaces 28 during the molding operation. In certain instances, the shoulders 24 can be eliminated, in which case the molded product, instead of having ribs along each side, will have upwardly facing edges or shoulders along each side.

As the parting line between the male and female molds and the resulting flash is located substantially along the neutral axis, the removal of the flash and the severing of any fibrous reinforcement in the flash will not adversely effect the physical properties of the spring. Because of this, the spring has improved physical properties.

Various modes of carrying out the invention are contemplated as being within the scope of the following claims particularly pointing out and distinctly claiming the subject matter which is regarded as the invention.

I claim:

1. A method of producing a fiber reinforced plastic leaf spring having a curved central section and end sections connected to the ends of said central section, said central section having a neutral stress axis disposed substantially midway between its upper and lower surfaces, said method comprising the steps of forming a female mold including a bottom wall and a pair of side walls and rounded corners connecting said bottom wall and said side walls, forming a generally concave male mold having a top wall and a pair of side walls connected to said top wall by rounded inside corners, said side walls terminating in generally flat laterally extending extremities, placing substantially continuous strands of fibrous material impregnated with a liquid thermosetting resin in said female mold, inserting the male mold in the female mold with said laterally extending extremities positioned inside said side walls of said female molds, compressing said fibrous material by moving the molds relative to each other to cause a portion of said liquid resin to be extruded laterally along the joint between said molds in the form of flash, discontinuing the compressing of said fibrous material when said laterally extending extremities are at said neutral axis, curing the resin to provide a rigid molded leaf spring, removing the spring from the molds, and thereafter severing said flash along a plane that lies substantially along said neutral axis, said central section having rounded upper and lower edges and having an upwardly facing shoulder disposed along the neutral axis and extending longitudinally along each side of said central section.

2. The method of claim 1, and including the step of forming an upwardly facing internal shoulder in each side wall of the female mold, said shoulders being in alignment with the respective lateral extremities of the side walls of the male mold, the resulting molded spring having longitudinally extending ribs projecting laterally from each side of the molded spring.

* * * * *